Patented Mar. 2, 1948

2,436,923

UNITED STATES PATENT OFFICE 2,436,923

DEMETHYLATION OF HYDROCARBONS IN PRESENCE OF WATER

Vladimir Haensel, Clarendon Hills, Ill., assignor to Universal Oil Products Company, Chicago, Ill., a corporation of Delaware No Drawing. Application April 8, 1946,
Serial No. 660,433

8 Claims. (Cl. 260—666)

This invention relates to the treatment of a normally liquid hydrocarbon with water in the presence of a hydrogenation catalyst to produce a hydrocarbon containing at least one carbon atom less than those present in the hydrocarbon charged to the process. More specifically, this invention is concerned with a catalytic process for treating with water, particularly water vapor or steam, a hydrocarbon containing more than 4 carbon atoms per molecule, said process being carried out at closely correlated conditions of temperature and charging rate so that the principal reaction of the process is the replacement with hydrogen and the scission of methyl groups to decrease the number of carbon atoms of said hydrocarbon by at least one carbon atom.

An object of this invention is the demethylation of a normally liquid hydrocarbon selected from the group consisting of a paraffin, an olefin, an alkyl aromatic, and a saturated alkyl hydroaromatic to produce therefrom a hydrocarbon of lower molecular weight.

Another object of this invention is the treatment of a saturated aliphatic hydrocarbon containing more than 4 carbon atoms per molecule with water at a demethylation temperature and in the presence of a hydrogenation catalyst to produce a paraffinic hydrocarbon of lower molecular weight.

A further object of this invention is the production of a paraffinic hydrocarbon of lower molecular weight by treating a paraffinic hydrocarbon containing more than 4 carbon atoms per molecule and water in the presence of an active hydrogenation catalyst at a demethylation temperature.

Another further object of this invention is the treatment with water in the presence of an active hydrogenation catalyst of a cyclic hydrocarbon comprising a ring of 6 carbon atoms and an alkyl side chain to decrease the number of carbon atoms in said alkyl side chain of said hydrocarbon by at least one carbon atom by removing only one methyl group or several methyl groups from said alkyl side chain.

A still further object of this invention is the treatment with water in the presence of an active hydrogenation catalyst of an alkyl aromatic hydrocarbon to remove one methyl group or several methyl groups from the alkyl side chain of said aromatic hydrocarbon.

One specific embodiment of the present invention comprises a process for reacting water with a hydrocarbon containing more than 4 carbon atoms per molecule in the presence of a metal with an atomic number of at least 27 and of the eighth group of the periodic table at a demethylation temperature and recovering the resultant demethylated hydrocarbons.

A further embodiment of the present invention comprises a process for reacting water with a paraffinic hydrocarbon containing more than 4 carbon atoms per molecule in the presence of a nickel catalyst at a temperature of from about 180° to about 350° C. to split from said hydrocarbon only one methyl group or several methyl groups and form a paraffinic hydrocarbon of lower molecular weight.

I have found that normally liquid hydrocarbons including paraffinic, olefinic, alkyl naphthenic and alkyl aromatic hydrocarbons are demethylated by reaction with water in the presence of an active hydrogenation catalyst at a relatively narrow range of operating temperatures much below the temperatures needed for the interaction of hydrocarbons with steam to substantially gasify the hydrocarbons and produce only hydrogen and carbon oxides. My process selectively removes methyl groups from the different hydrocarbons charged thereto and produces hydrocarbon products containing one carbon atom less per molecule than present in the hydrocarbons charged to the process.

Hydrocarbons which are demethylated by my process have more than 4 carbon atoms per molecule and generally include an alkyl group preferably containing at least 2 carbon atoms and comprise paraffins, olefins, alkyl aromatics and saturated alkyl hydroaromatics. The paraffinic hydrocarbons include both normal and branched chain paraffins. Alkyl aromatic hydrocarbons which are demethylated by my process include toluene, monoethylbenzene, monopropylbenzene and monoisopropylbenzene and other monoalkyl benzenes having more than 3 carbon atoms in the alkyl group as well as dialkyl and polyalkyl benzenes. Besides the alkyl benzene hydrocarbons, other alkyl polycyclic aromatic hydrocarbons may also be demethylated. The saturated hydroaromatic hydrocarbons which are demethylated by my process include methylcyclohexane, ethylcyclohexane and other alkyl cyclohexanes of higher molecular weight containing at least one alkyl group.

The paraffinic hydrocarbons treated by the process of this invention comprise the normally liquid paraffins and particularly those containing at least 6 carbon atoms per molecule. The process is applicable to both normal and branched chain paraffinic hydrocarbons. When producing triptane, the octane, 2,2,3-trimethylpentane, is a preferred charging stock, but this octane is not the only aliphatic hydrocarbon convertible into triptane. Similarly, 2,3,3-trimethylpentane may also be demethylated into triptane as is true with certain highly branched nonanes, decanes and other hydrocarbons containing a triptyl group. By a triptyl group I mean an alkyl group containing a quaternary carbon atom adjacent to a tertiary carbon atom. Thus, a triptyl group contains vicinal tertiary and quaternary carbon atoms.

The demethylation reaction carried out according to my process may be represented by the following Equation 1 as follows:

$$RCH_3 + 2H_2O \rightarrow RH + CO_2 + 3H_2 \qquad (1)$$

wherein R represents an alkyl group, an alkenyl group, an aryl group or a cycloparaffin group. The alkenyl group is generally hydrogenated to an alkyl group during the process. The aryl group is preferably a phenyl group and the cycloparaffin group is preferably a cyclohexyl group. Although no hydrogen is charged to the process represented by this equation, it may sometimes be desirable to recycle to the process a hydrogen-containing gas formed therein.

Analysis of the non-condensible gases formed in the process showed the presence of substantial amounts of methane. This methane formation was due to reaction of hydrogen formed in the process with a portion of the liquid hydrocarbon in the presence of the hydrogenation catalyst. Accordingly more of the liquid hydrocarbon lost a methyl group than that reacting with water. For each molecule of hydrogen that reacted with the liquid hydrocarbon, one molecule of methane was produced according to Equation 2:

$$RCH_3 + H_2 \rightarrow RH + CH_4 \qquad (2)$$

Accordingly as Equation 1 represents the primary reaction of the liquid hydrocarbon with water, the sum of the volumes of hydrogen and methane formed in the process should be three times the volume of the carbon dioxide produced. These were approximately the proportions of the carbon dioxide and the hydrogen-methane mixtures formed in the runs obtained and referred to in the examples.

Active hydrogenation catalysts which are used in the process contain one or more metals of the eighth group of the periodic table with an atomic number of at least 27. The active hydrogenation catalysts thus include cobalt, nickel, ruthenium, rhodium, palladium, osmium, iridium and platinum. Nickel and cobalt are preferred catalysts for demethylation of hydrocarbons in the presence of water, particularly because of the general availability of these metals. The different demethylation catalysts comprising metals or metal oxides of the mentioned eighth group metals having hydrogenating activities may be used as such, but preferably they are supported by a carrier such as alumina, silica, diatomaceous earth, crushed porcelain or some other refractory material which has substantially no adverse influence upon the demethylation.

A highly active nickel catalyst which is used in the present process contains approximately 66% by weight of total nickel, 30% of diatomaceous earth, and 4% of oxygen, the latter present in nickel oxide. This catalyst was made by the general steps of suspending diatomaceous earth, also known as kieselguhr, in a dilute aqueous solution of nickel sulfate and then gradually adding thereto an excess of a hot saturated solution of sodium carbonate. The mixture of nickel sulfate solution and diatomaceous earth was agitated vigorously while the sodium carbonate solution was introduced thereto to form a precipitate which was removed by filtration, and was then washed, dried, heated, and reduced with hydrogen.

The resultant nickel-diatomaceous earth catalyst is employed in powder form when demethylation is effected in batch type treatment or in the fluidized or fluidized fixed bed type of operation. When pelleted or formed catalyst particles are desired, the powdered mixture, preferably before being subjected to reduction with hydrogen or a reducing gas mixture, is mixed with graphite or some other lubricant and formed into pellets by a pilling machine. Other nickel-containing catalysts which may be employed similarly may be prepared to contain proportions of nickel different from those aforementioned.

Cobalt catalysts were prepared by essentially the same series of steps as were used in producing nickel-diatomaceous earth catalyst composites. Diatomaceous earth and cobalt nitrate so proportioned as to give essentially the same ratio of cobalt to silica as of nickel to silica in the above-described catalyst, were mixed with water and then treated with an excess of a hot saturated solution of sodium carbonate. The mixture of cobalt nitrate solution and diatomaceous earth suspended therein was agitated vigorously while the sodium carbonate solution was added thereto to form a precipitate which was removed by filtration and was then washed, dried, and reduced to give an active cobalt-diatomaceous earth catalyst, utilizable in the form of powder or pellets in essentially the same manner as the nickel-diatomaceous earth catalyst.

The process of this invention is carried out by contacting water and a hydrocarbon with one or more of the mentioned hydrogenation catalysts at a carefully selected operating temperature. The temperatures generally used are from about 180° to about 350° C. and the operating pressures are from substantially atmospheric to a superatmospheric pressure, generally not more than about 200 atmospheres. The proportions of water to hydrocarbon charged to the process are also controlled so that generally from about 2 to about 12 molecular proportions of water are present per molecular proportion of hydrocarbon charged to the process.

My demethylation process is carried out using either batch or continuous types of operation. In the continuous type of treatment which is preferred, a hydrocarbon and water generally in the form of steam are passed through a reactor containing a catalyst of the type herein described and the reaction products are discharged continuously from the reactor at substantially the same rate as that at which the reactants are charged thereto. The products of the demethylation treatment are fractionated by suitable means to separate the desired low boiling hydrocarbons from the unconverted portion of the hydrocarbon material charged to the process and said unconverted material is recycled to commingle with the hydrocarbon material charged.

Demethylation of neohexane by my process yielded a reaction product containing propane, isobutane, normal butane, neopentane, isopentane, normal pentane and some unreacted neohexane. The presence of neopentane in the reaction product indicated selectivity of demethylation. In other runs the demethylation of toluene in the presence of a nickel-kieselguhr catalyst yielded benzene as illustrated by the following equation:

$$C_6H_5CH_3 + 2H_2O \rightarrow C_6H_6 + CO_2 + 3H_2$$

The following examples are given to illustrate the process of this invention, although with no intention of limiting unduly its generally broad scope.

Example I

Neohexane and water were charged continuously to a steel tube containing a layer of previously reduced nickel-kieselguhr catalyst in the form of 3x3 mm. pellets maintained at a temperature of 263° C. and at atmospheric pressure. The neohexane was charged at an hourly liquid space velocity of 0.86 and the water was charged at an hourly liquid space velocity of 0.94. The molar ratio of water to neohexane charged was thus 7.75. The resultant reaction product consisted of 20% by weight of non-condensible gas and 80% by weight of a liquid mixture of hydrocarbons. The hydrocarbon mixture formed in the process contained 3.5 mole % of propane, 1% isobutane, 1.3% n-butane, 2.7% isopentane, 2.1% normal pentane, 3.7% neopentane, 75% unconverted neohexane, 8.4% 2,3-dimethylbutane and 2.1% of dissolved carbon dioxide. The non-condensible gas content analyzed 21.0% carbon dioxide, 0.6% carbon monoxide, 38.3% hydrogen and 40.1% methane.

Example II

Following the procedure of Example I, normal heptane was charged at an hourly liquid space velocity of 1.42 and water at an hourly liquid space velocity of 1.07 to a reactor containing a nickel-kieselguhr catalyst at a temperature of from 300° to 310° C. at atmospheric pressure. The mole ratio of water to heptane charged was 6.13. By this treatment 21.3% of the normal heptane was converted into lower boiling hydrocarbons. The product consisted of 80.6% liquid hydrocarbons and 19.4% gas, the latter containing 21.1% carbon dioxide, 26.5% hydrogen and 52.4% methane.

Example III

Another demethylation run was made on a trimethylpentane mixture consisting of approximately 35% of 2,2,3-trimethylpentane, 10% of 2,3,3-trimethylpentane and 55% of 2,3,4-trimethylpentane. This trimethylpentane mixture was charged at an hourly liquid space velocity of 1.55 and water was charged simultaneously at an hourly liquid space velocity of 1.12 to a steel reactor containing a nickel-kieselguhr catalyst maintained at a temperature of 303° to 310° C. and at a pressure of 15 atmospheres. The mole ratio of water to the trimethylpentane mixture was 6.43. By this treatment 24.4% of the trimethylpentane was converted into lower boiling products consisting of 16% condensible gas and 84% of $C_5$—$C_7$ hydrocarbons. The $C_5$—$C_7$ hydrocarbons consisted of small amounts of pentanes, some neohexane, triptane and 2,3-dimethylpentane.

The condensible gas contained 12.8 mole % propane, 34.4% isobutane, 20.6% normal butane, 5.8% isopentane, 3.1% normal pentane, 21.4% neopentane and 1.9% of hexanes and higher hydrocarbons. The non-condensible gas contained 22.0% carbon dioxide, 0.2% carbon monoxide, 21.8% hydrogen and 55.6% methane.

Example IV

Methylcyclohexane was charged at an hourly liquid space velocity of 1.38 and water at an hourly liquid space velocity of 1.25 at a pressure of 15.2 atmospheres to a steel reactor containing nickel-kieselguhr catalyst maintained at a temperature of 285° to 303° C., the temperature being lowest at the inlet and highest at the exit of the reactor. The molar ratio of water to methylcyclohexane charged was thus 6.56. The treatment converted 35% of the methylcyclohexane into toluene and a smaller amount of the methylcyclohexane was converted into lower boiling hydrocarbons. Non-condensible gases formed in the treatment contained 1.5% carbon dioxide, 91.7% hydrogen, 6.6% methane and 0.2% olefins.

Example V

Toluene was charged at an hourly liquid space velocity of 1.46 and water at an hourly liquid space velocity of 1.85 at atmospheric pressure to a steel tube containing nickel-kieselguhr catalyst maintained at 263° to 266° C. The molar ratio of water to toluene charged was thus 8.1. The reaction product obtained was found to contain 6% of benzene, while the non-condensible gases analyzed 23.6% carbon dioxide, 0.8% carbon monoxide, 75.4% hydrogen and 0.2% methane.

The character of the present invention and type of results obtained are evident from the preceding specification and examples, although they are not to be construed as imposing undue limitations upon its broad scope.

I claim as my invention:

1. A process for producing a paraffinic hydrocarbon of lower molecular weight from a paraffinic hydrocarbon containing more than 4 carbon atoms per molecule, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. in the presence of an active hydrogenation catalyst comprising a metal of group VIII of the periodic table with an atomic number of at least 27.

2. A process for producing a paraffinic hydrocarbon of lower molecular weight from a paraffinic hydrocarbon containing more than 4 carbon atoms per molecule, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. to about 100 atmospheres in the presence of an active nickel hydrogenation catalyst.

3. A process for producing a paraffinic hydrocarbon of lower molecular weight from a paraffinic hydrocarbon containing more than 4 carbon atoms per molecule, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. to about 100 atmospheres in the presence of an active cobalt hydrogenation catalyst.

4. A process for producing triptane from an aliphatic hydrocarbon containing at least 8 carbon atoms per molecule including vicinal quaternary and tertiary carbon atoms, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. to about 100 atmospheres in the presence of an active hydrogenation catalyst comprising a metal of group VIII of the periodic table with an atomic number of at least 27.

5. A process for producing neopentane from an aliphatic hydrocarbon containing at least 6 carbon atoms per molecule including a quaternary carbon atom, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. to about 100 atmospheres in the presence of an active hydrogenation catalyst comprising a metal of group VIII of the periodic table with an atomic number of at least 27.

6. A process for producing triptane from an aliphatic hydrocarbon containing at least 8 carbon atoms per molecule including vicinal quaternary and tertiary carbon atoms, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. and at a pressure of from substantially atmospheric to about 100 atmospheres in the presence of an active nickel hydrogenation catalyst.

7. A process for producing neopentane from an aliphatic hydrocarbon containing at least 6 carbon atoms per molecule including a quaternary carbon atom, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. and at a pressure of from substantially atmospheric to about 100 atmospheres in the presence of an active nickel hydrogenation catalyst.

8. A process for the demethylation of a hydrocarbon containing more than 4 carbon atoms per molecule and selected from the group consisting of paraffins, olefins, alkyl aromatics and saturated alkyl hydroaromatics, which comprises commingling water with said hydrocarbon in an amount of from about 2 to about 12 molecular proportions of water per molecular proportion of hydrocarbon, and subjecting the resultant mixture to reaction at a temperature of from about 180° to about 350° C. in the presence of an active hydrogenation catalyst comprising a metal of group VIII of the periodic table with an atomic number of at least 27.

VLADIMIR HAENSEL.

REFERENCES CITED

The following references are of record in the file of this patent:

UNITED STATES PATENTS

| Number | Name | Date |
| --- | --- | --- |
| 1,374,119 | Stevens | Apr. 5, 1921 |
| 1,599,629 | Anderson | Sept. 24, 1926 |
| 2,028,795 | McKee | Jan. 28, 1936 |

FOREIGN PATENTS

| Number | Country | Date |
| --- | --- | --- |
| 127,690 | Switzerland | Sept. 1, 1928 |